United States Patent [19]

Magenau et al.

[11] Patent Number: 5,175,505
[45] Date of Patent: Dec. 29, 1992

[54] CAPACITIVE SENSOR FOR MEASUREMENT OF A FUEL WALL FILM, PARTICULARLY IN AN INTAKE DUCT OF AN INTERNAL COMBUSTION ENGINE

[75] Inventors: Horst Magenau, Gerlingen; Nikolaus Simon, Murnau A Staffelsee; Heins-Erdam Bollhagen, Leonberg; Siegbert Steinlechner, Leonberg-Warmbronn; Berthold Wocher, Leonberg, all of Fed. Rep. of Germany

[73] Assignee: Robert Bosch GmbH, Stuttgart, Fed. Rep. of Germany

[21] Appl. No.: 766,444

[22] Filed: Sep. 26, 1991

[30] Foreign Application Priority Data

Oct. 4, 1990 [DE] Fed. Rep. of Germany ....... 4031210

[51] Int. Cl.[5] .......................... G01D 5/24; G01B 7/04; G02D 41/00
[52] U.S. Cl. .................... 324/671; 324/678; 324/687; 324/688; 73/304 C
[58] Field of Search ............... 324/678, 687, 688, 690, 324/671; 73/304 C

[56] References Cited

U.S. PATENT DOCUMENTS

| | | | |
|---|---|---|---|
| 3,739,265 | 6/1973 | Skildum | 324/687 |
| 3,775,277 | 11/1973 | Pompei | 324/687 |
| 4,423,371 | 12/1983 | Senturia | 324/687 |

Primary Examiner—Kenneth A. Wieder
Assistant Examiner—Jose M. Solis
Attorney, Agent, or Firm—Michael J. Striker

[57] ABSTRACT

A capacitive sensor includes a plurality of individual condenser elements, each of which consist of a first, preferably circular, electrode and a second, preferably surrounding ring-shaped, electrode, which are mounted on one side of a nonconducting support. A common conductor is connected to each of the first electrodes of condenser elements. A signal can be detected separately from each of the condenser elements via conductors connected separately to the individual second electrodes. To increase the sensitivity and to avoid interference, the remote side of the support opposite to the one side is provided with a third additional electrode, which is at ground potential and also acts as a shield for interfering couplings. The sensor is used for measurement of the fuel film thickness in the intake of an internal combustion engine.

13 Claims, 3 Drawing Sheets

CAPACITIVE SENSOR FOR MEASUREMENT OF A FUEL WALL FILM, PARTICULARLY IN AN INTAKE DUCT OF AN INTERNAL COMBUSTION ENGINE

BACKGROUND OF THE INVENTION

The invention relates to a capacitive sensor for measurement of a fuel wall film and, more particularly, to a capacitive sensor for measurement of a fuel wall film in an internal combustion engine.

A capacitive sensor for measurement of a fuel film, comprising at least one condenser element consisting of two electrodes mounted on an insulating support, is known. Both electrodes are also mounted on the top side or one side of the insulating support and a are spaced laterally from each other on the side on which they are mounted. The electrodes of the condenser element or elements are connected with electrical conductors to an analyzer.

A capacitive method for determination of the thickness of a liquid film is known from the ATM Journal (Archives for Engineering Measurement, Section V, 1124-Nov. 19, 1972, pp. 201 to 204 (Archiv für technisches Messen, Blatt V, 1124-Nov. 19, 1972, Seiten 201 to 204). In this method a capacitive sensor is used, whose electrodes are comb-like and are toothed. These condenser elements form a lateral condenser, whose capacitance changes, when the electrodes and the intervening space are wet with a fluid. Since the capacitance changes because of the wetting by a liquid depend very strongly on the size of the capacitance, several capacitive circuit elements are connected together. It has been shown however that the sensitivity of this kind of sensor is comparatively poor, since on the rear side of the sensor an electric field arises, which provides a parasitic capacitance contribution. This capacitance contribution is larger than the change in the capacitance on the front side of the sensor due to the liquid, because of the dielectric constant of the substrate on which the electrodes are mounted. Thus, despite the larger capacity of the sensor, the analyzable capacitance change, which depends on the liquid film is relatively small. As a result, because of the presence of the interfering electric field the measurement of the wall film can be incorrect.

SUMMARY OF THE INVENTION

It is an object of the present invention to provide an improved capacitive sensor for measurement of a fuel wall film, especially in the intake duct of an internal combustion engine, which does not have the above-described disadvantages.

This object and others which will become more apparent hereinafter, is attained in a capacitive sensor for a fuel wall film which has at least one condenser element consisting of two electrodes mounted on an insulating support on one side of the support and spaced laterally from each other on the support, and an analyzing circuit connected with electrical conductors to the electrodes.

According to the invention, the capacitive sensor is provided with an additional third electrode, which is located on the other side of the support remote from the one side having the electrodes (i.e. on the top side of the sensor). This third electrode acts as a ground electrode for the laterally spaced electrodes on the support.

The capacitive sensor according to the invention has the advantage that the relative capacitance change on wetting the electrodes is large, since the additional ground electrode reduces the capacitive coupling between the electrodes by the rear side of the sensor, so that the largest capacitive contribution is supplied by the space between the electrodes on the one or top sensor side. Furthermore, the ground coating on the sensor rear side (or side remote from the side the electrodes are on) acts as a shield, so that the influence of interfering electrical fields is neutralized and the grounding surfaces in the vicinity of the rear side of the sensor do not influence the characteristic properties of the sensor.

If the ground electrode on the other side of the support actually goes through or penetrates the sensor so that it is partially located on the top side of the sensor, a particularly good shielding effect against disturbing electrical fields can be produced. The large ground surface has a very low resistance, so that the voltage shift in the ground electrode is very small.

Advantageously, the effect of parasitic capacitance on the rear side of the sensor can be largely avoided.

It is particularly advantageous that the laterally spaced electrodes and the ground electrodes are mounted on the top surface of a plastic foil. The plastic foil should be a good insulator, easily formable or deformable and easily provided with conductive layers.

It is particularly advantageous, when both the measurement range and the measurement sensitivity is variable by changing the arrangement and form of the electrodes. Because of that the sensor can be easily designed to fit the needs of the specifications of the system in which the liquid film is being measured.

The construction of the capacitive sensor of the invention is easier when the condenser elements are energized with a common generator. Parallel connection of the electrodes of the sensor elements is desirable, because then only a comparatively few conductors are needed on the support. It is particularly advantageous, when no high current peaks result when the electrode potential reverses as the electrodes are energized by a sinusoidally oscillating or periodic saw-tooth potential.

It is also advantageous that the individual condenser elements are located in narrow adjacent shafts in the support. Without that type of mounting a distortion of the measured signal results. Also advantageously that type of sensor can be inserted in a comparatively narrower space.

When lateral electrodes are connected to the ground potential, a zero potential difference exists between these electrodes and the third electrode. The measured signal thus can be transmitted over a longer conductor.

BRIEF DESCRIPTION OF THE DRAWING

The objects, features and advantages of the present invention will now be illustrated in more detail by the following detailed description, reference being made to the accompanying drawing in which.

DETAILED DESCRIPTION OF THE PREFERRED EMBODIMENTS

Figure 1:
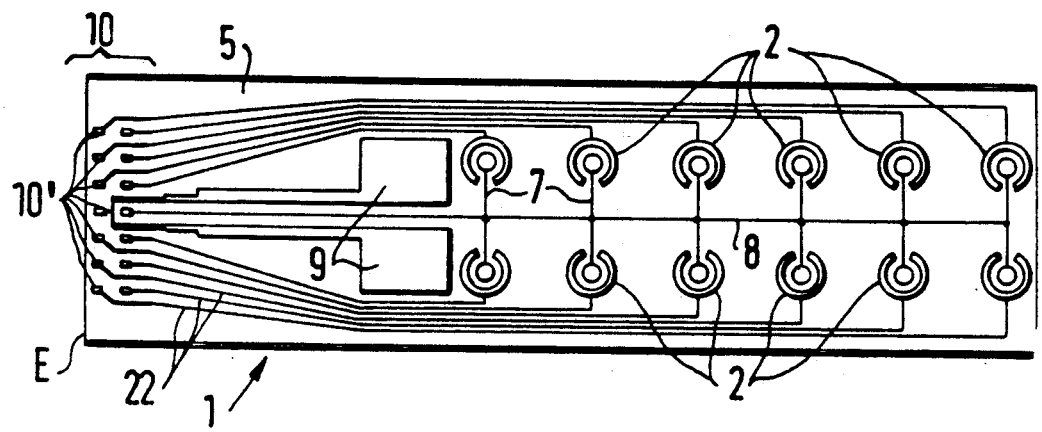
FIG. 1 is a top plan view of a first embodiment of a capacitive sensor according to the invention.
Figure 2:
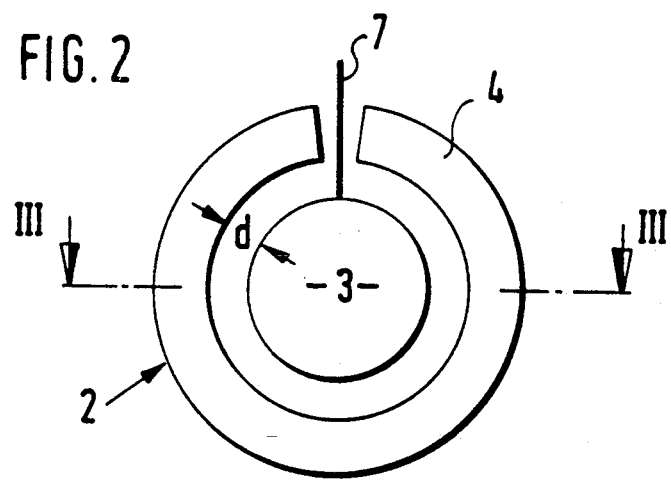
FIG. 2 is a plan view of a sensing condenser element of the capacitive sensor of FIG. 1.

A first embodiment of the capacitive sensor 1 is shown in FIG. 1. Condenser or sensor elements 2 are mounted spaced laterally from each other on a support 5, which is formed from an insulator made from a plastic material, such as polyimide. In the embodiment shown in FIG. 1 the condenser elements 2 are spaced pairwise one on each side of a longitudinal axis A of the support 5. The support can be made from a flexible material. As is apparent from the enlarged condenser element shown in FIG. 2, each condenser element has a first circular electrode 3, which is surrounded by a second electrode having the shape of a ring with a gap. The second electrode is spaced a distance d from the first electrode. A connecting line or path 7 passes through the gap in the second electrode 4. The electrodes are made of electrically conductive material, for example, copper, aluminum, gold, carbon or silver alloy. The electrodes 3,4 are applied, for example, as a laminate. The first electrode 3 of the condenser element is connected by the connecting line 7 with a common conductor 8 The common conductor 8 is shielded by two parallel rectangular grounding elements 9, which are applied to the support 5.

Figure 3:
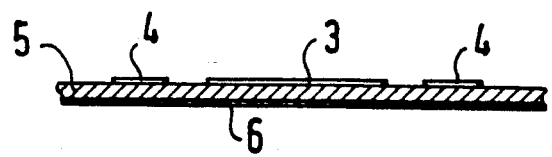
FIG. 3 is a cross-sectional view through the capacitive sensor of FIG. 1.

The rear side of the support 5 is provided with a throughgoing conducting laminate 6 which forms the third electrode of the invention. The structure is easily understood, particularly from the cross-sectional view of FIG. 3 The support 5 can be formed as a flexible foil, which is easily adjustable, especially to a curved surface.

In FIG. 1 the sensor 1 is seen to have condenser elements 2 arranged in a comparatively narrow closely spaced array in rows and columns. The individual elements are supplied with an alternating voltage by the common conductor 8, which is fed to the first electrodes 3 of the condenser elements. The second electrodes 4 of the condenser elements 2 are connected by separate conductors 22 to a plurality of terminals 10' in a connector strip 10 at an edge E of the support. If the rear side ground or third electrode 6 is counted together with these conductors, then for the n condenser elements 2 a total of n+2 separate electrical conductors is required. The number of condenser elements 2 is a matter of design choice. When, for example, the sensor is used for measurement of the fuel film height, then it is particularly desirable to connect the second electrodes with separate connecting conductors to the conducting strip 10, since the fuel film height at the individual locations in the fuel intake can be very different. One obtains, because of that, several measuring points, which can be connected with several separate conductors 22.

Figure 4:
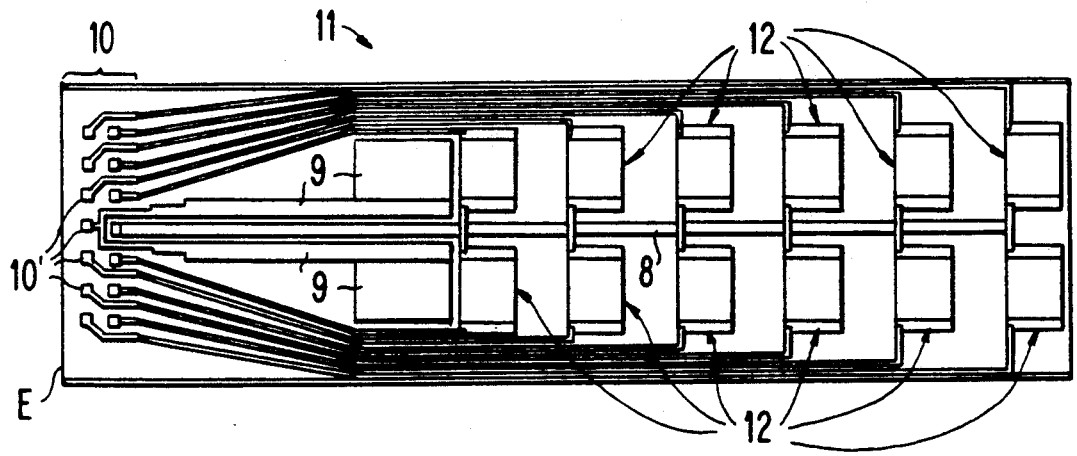
FIG. 4 is a top plan view of a second embodiment of a capacitive sensor according to the invention.
Figure 5:
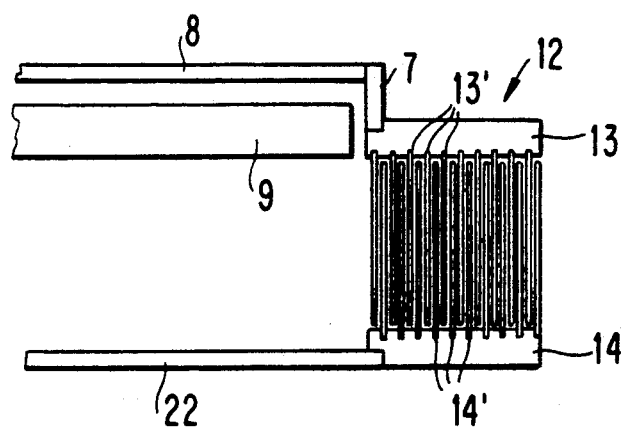
FIG. 5 is a plan view of another embodiment of a sensing condenser element from the capacitive sensor of FIG. 4.
Figure 6:
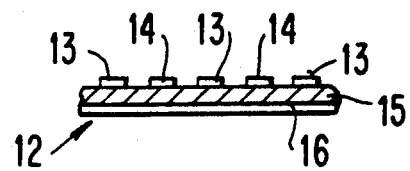
FIG. 6 is a cross-sectional view of the capacitive sensor shown in FIG. 4, particularly showing one of the condenser elements of FIG. 5.

A second embodiment of the invention is shown in FIGS. 4 and 6. The sensor 11 has at least one condenser element 12, which has comb-like electrodes 13, 14, which fit next to each other like teeth, so that the total capacitance of a condenser element 12 is the sum of the capacitance due to the individual teeth or bars 13',14' positioned opposite or next to each other. The condenser elements 12 have the same arrangement on the support as in the first embodiment. The electrodes 13 are connected by a common conductor 8. The common conductor 8 is, as in the first embodiment, protected by parallel guided grounding elements 9. The grounding elements 9 are connected electrically, as in the first embodiment, with the ground or third electrode 6 on the rear side of the support 5. The second electrodes 14 of the condenser element 12 are connected individually by separate conductors 22 to the terminals 10' of the connecting strip 10.

In FIG. 6 a cross-sectional view through a condenser element 12 of the capacitive sensor is seen. The arrangement of the electrodes 13, 14 and the ground electrodes 16 on both sides of the support 15 is particularly clearly shown.

Figure 7:
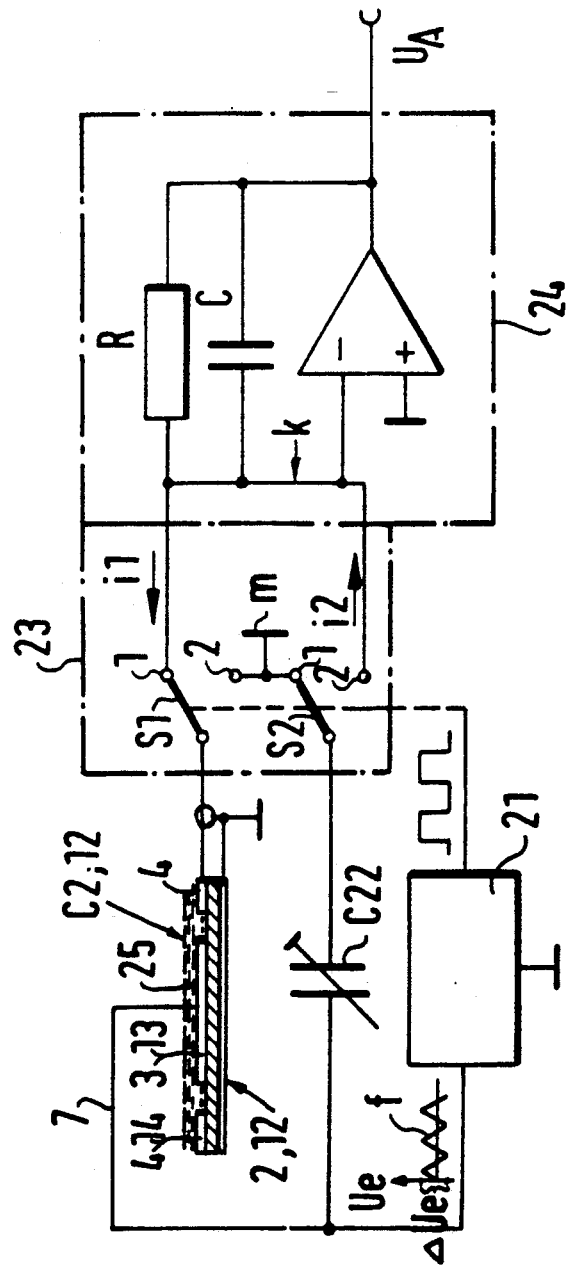
FIG. 7 is a circuit diagram of an analyzing device for analyzing signals from the capacitive sensor according to the invention.

In the following the operation of these examples is described. The sensor is especially suitable for measurement of the wall film height of a fuel in the intake pipe of a internal combustion engine, especially gasoline or diesel fuel. For this purpose, the sensor is built into the inner pipe of the intake connector of the internal combustion engine at the location to be measured. The measured signals are fed from the device via the connector strip 10 and can be analyzed as shown in FIG. 7 by an analyzer unit.

When the surface of the sensor 1; 11 is wetted with fuel 25, then the capacitance of the condenser element 2; 12 changes depending on the height of the fuel film 25. For conversion of the capacity change an analogous voltage signal $U_A$ is generated depending on the film height, which is readable at the output of a feedback operatonal amplifier(FIG. 7), which acts as a low pass filter element.

Advantageously the electrodes 3, 13 are energized by a generator 21 common for all sensors with a sawtoothed or sinusoidal applied potential $u_e$ with a frequency f of for example, 200 kHz and a voltage height $\Delta u_e$ between the extreme values of for example 10 V. The electrodes 4; 14 are connected by the reversing contact S1 of the electronic switch 23, either with the inverted input k of the feed back coupled operational amplifier 24 or connected with the ground m. A comparison condenser C22 is associated with each condenser element (C2; 12) 2; 12. The comparison condenser is connected with the first electrode 3 (and/or the generator voltage $u_e$), while the second electrode 4 is connected by a reversing contact S2 of the electronic switch 23 to the ground m or the inverting input k of the operational amplifier 24. The switches S1 and S2 changing their switch positions (1 and/or 2) are phase-locked with the alternating voltage $u_e$, when the alternating voltage $u_e$ reaches its upper or lower extreme value.

Because of the feed back coupled operational amplifier the junction or nodal point k remains at constant potential. On switching of both switches the potential of the connections C2; 12 and C22 advantageously does not change. The switch provides that charge changes of the condenser C2; 12 and C22 occurs from different charge sources according to the switch position configuration: in the switch position 1 from the nodal point k, in switch position 2 from the nodal or junction point m. The parasitic capacitance, which results from the third electrode 6,16 on the rear side of the sensor 1; 11 and the electrodes 4; 14 and the parasitic capacitance of the connecting conductors 22 for the electrodes 4;14 provide in an advantageous way no contribution to the charge exchange or change because of the potential variations.

During the decrease phase of the potential $u_e$, the switch position 1 is set so that the condenser C2 is charged and takes a charge $q1 = C2*\Delta u_e$ from the nodal point k of the operational amplifier. During the increasing stage of $u_e$, then at switch position 2 the comparison condenser C22 is charged and supplies the charge $q2 = C22*\Delta u_e$ to the nodal point K.

At the frequency F of the energizing voltage and thus the charge transport two pulses of are produced with the average values $$i_1 = C2 * f * \Delta u_e \qquad i_2 = C22 * f * \Delta u_e$$

which superimpose at the nodal point K.

For the output direct voltage of the operational amplifier, which has low-pass characteristics because of the condenser C, the following formula controls:

$$U_A - R*(i_1 - i_2) = \Delta u_e * R * f * (C2 - C22)$$

In the absence of fuel film, the comparator condenser C22 is balanced so that $U_A = 0$.

If a fuel film is present, the capacitance C2 increases and an output voltage depending on the film thickness arises.

Because of the absence of potential fluctuations at the electrodes 4; 14 and because of the associated connecting conductors, parasitic capacitances do not adversely effect the sensitivity of the sensor. Thus the rear side third electrode can be used advantageously as a shield against the interfering couplings and as a shield against external interfering radiation, so that the sensitivity of the capacitive sensor of the invention can be greater than those of the prior art.

Signals of sensors with adjacent connecting lines advantageously show no interfering capacitive couplings, because of the negligibly small potential fluctuations. Because of that many parallel sensor connecting lines can be accommodated in a small space. The connecting conductors can be comparatively long and this allows a comparatively remote location for the electronic switch.

Since parasitic capacitances are practically negligible in the substrate, fluctuations in the dielectric constant of the substrate, for example which might occur because of temperature variations, are, for all practical purposes of the device described here, negligible. The substrate can be chosen on the basis of other properties, for example flexibility.

It will be understood that each of the elements described above, or two or more together, may also find a useful application in other types of constructions differing from the types described above.

While the invention has been illustrated and described as embodied in a capacitive sensor for measurement of a fuel wall film, particularly in an intake duct of an internal combustion engine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

1. In a capacitive sensor for measurement of a thickness of a fuel wall film in an intake duct of an internal combustion engine, said capacitive sensor comprising an insulating support, a plurality of condenser elements, each of the condenser elements having two electrodes and being mounted on one side of the support, each of said two electrodes being spaced laterally from each other on the one side, and a plurality of electrical conductors for connection of the condenser elements to an analyzer unit for determining the thickness of the film, the improvement comprising a third electrode mounted on another side of the support, the other side being opposite and remote from the one side, and the third electrode being formed and connected as a ground electrode for the laterally spaced electrodes of the condenser elements; and a common generator connected to each of the condenser elements to apply a common voltage across the two electrodes of each of the condenser elements to energize the condenser elements.

2. The improvement as defined in claim 1, wherein the third electrode acting as the ground electrode extends through the support from the other side to the one side.

3. The improvement as defined in claim 1, wherein the support comprises a plastic foil.

4. The improvement as defined in claim 3, wherein the plastic foil contains a polyimide.

5. The improvement as defined in claim 1, wherein a first one of the two electrodes of each of the condenser elements is a circular electrode (3) and a second one of the two electrodes of each of the condenser elements is an annular electrode (4).

6. The improvement as defined in claim 5, further comprising a connecting line (7) for the circular electrode (3), and wherein the second electrode has a gap and the connecting line (7) passes through the gap and is connected to the circular electrode (3).

7. The improvement as defined in claim 1, wherein the two electrodes of each condenser element are spaced a predetermined distance (d) from each other and the predetermined distance (d) is determined according to the desired sensitivity.

8. The improvement as defined in claim 1, wherein the first electrode is comb-like and comprises a first plurality of teeth and the second electrode is also comb-like and comprises a second plurality of teeth and teeth in the first plurality are positioned to fit between the teeth of the second plurality, so that the teeth in the first plurality are spaced a certain predetermined distance from the teeth in the second plurality and the predetermined distance is chosen according to the sensitivity.

9. The improvement as defined in claim 1, wherein a plurality of the condenser elements (2; 12) are provided closely spaced from each other laterally on the one side.

10. The improvement as defined in claim 1, wherein a first one of the two electrodes of each of the condenser elements is a circular electrode (3) and a second one of each of the two electrodes of the condenser elements is an annular electrode (4) and the support has a central axis and the condenser elements (2) are positioned pairwise one on each side of the central axis, and further comprising a common one of the conductors running along the central axis and a connecting line for each of the circular electrodes, each of the connecting lines being connected to one of the circular electrodes at one end and to the common conductor at another end, and further comprising a connector strip at one edge of the support having a plurality of terminals each of which is connected by one of the conductors to one of the annular electrodes, and also further comprising two substantially rectangular grounding elements on each side of the central axis on the one side of the support, each of the ground conducting elements being connected electrically to the third electrode on the other side.

11. In a capacitive sensor for measurement of a thickness of a fuel wall film in an intake duct of an internal combustion engine, said capacitive sensor comprising an insulating support having a central axis, a plurality of pairs of condenser elements mounted on one side of the support, the condenser elements in each pair of condenser elements being positioned on opposite sides of the central axis of the support and each of the condenser elements having two electrodes and, each of said two electrodes being spaced laterally from each other on the one side of the support by a predetermined distance determined by a sensitivity of the sensor; a plurality of electrical conductors for connection of the electrodes of the condenser elements to an analyzer unit including a common conductor extending along the central axis of the support; a third electrode mounted on another side of the support, the other side being opposite and remote from the one side, and the third electrode being formed and connected as a ground electrode for the laterally spaced electrodes of the condenser elements; two parallel rectangular grounding elements for shielding the common conductor positioned on each side of the central axis and the common conductor and being connected electrically to the third elements; and a common generator connected to each of the condenser elements to apply a common alternating voltage across the two electrodes of each of the condenser elements to energize the condenser elements.

12. The improvement as defined in claim 1, wherein the common generator is structured to produce one of a saw-toothed alternating voltage and a sinusoidal alternating voltage to energize the condenser elements (2; 12).

13. The improvement as defined in claim 1, further comprising an amplifier with an input and wherein one of the electrodes (4; 14) of the at least one condenser element (2; 12) is alternately connectable with one of a ground and the input of the amplifier (24).

* * * * *